United States Patent [19]

Brophy et al.

[11] 4,071,908
[45] Jan. 31, 1978

[54] ADAPTIVE POLLING TECHNIQUE

[75] Inventors: Francis Joseph Brophy, East Windsor; Jeremiah Francis Hayes, Tinton Falls, both of N.J.

[73] Assignee: Bell Telephone Laboratories, Incorporated, MurrayHill, N.J.

[21] Appl. No.: 778,352

[22] Filed: Mar. 17, 1977

[51] Int. Cl.[2] .......................... G06F 3/04; H04Q 5/00
[52] U.S. Cl. .................................. 364/900; 178/2 C; 179/18 FG; 340/147 G
[58] Field of Search .............................. 364/200, 900; 340/147 G, 147 LP, 147 T, 147 R; 178/2 R, 2 C, 2 D, 2 E, 3, 4.1 B; 179/2 DP, 18 FF, 18 FG

[56] References Cited

U.S. PATENT DOCUMENTS

3,890,460  6/1975  Haas et al. ...................... 178/2 C

*Primary Examiner*—Kathleen H. Claffy
*Assistant Examiner*—Kenneth A. Chayt
*Attorney, Agent, or Firm*—Roy C. Lipton

[57] ABSTRACT

Messages are collected by a central polling station from a plurality of remote terminal stations on a multiparty line. The central polling station is arranged to initially query stations in groups, probing successively smaller size subgroups of each group if a station in the group returns an acknowledgement that it has a message and eventually addressing individual stations to collect the messages. In heavily loaded periods, when a large quantity of messages are available at the terminals, the polling station initially queries a smaller size subgroup (or in the extreme, initially addresses individual stations) while in lightly loaded periods, when few or no messages are available, the polling station initially queries a larger size group (or in the extreme, initially broadcasts a query to all of the terminals). Loading of the system is determined by measuring the duration of time required for polling and collecting all the available messages.

13 Claims, 5 Drawing Figures

ADAPTIVE POLLING TECHNIQUE

Description of the Prior Art

There are many applications in which it is desirable to collect data messages from a plurality of remote terminals. Illustrative applications include telemetering and alarm detection systems. Such applications require that a central collection station perform two basic tasks; first, determine when a remote terminal has a message to transmit and second, establish communications with that remote terminal in order to receive the transmitted message. Two general methods utilized in the prior art to accomplish the aforementioned tasks are a polling method and a probing method.

The polling method requires the central station to address each remote terminal, collect the message if one is available thereat, and then move on to the next remote terminal. It is necessary for the central station to address every remote terminal including those who do not have any messages. Typically, the messages in the illustrative applications are very short and in lightly loaded periods, where very few or none of the stations have available messages to send, the time required for sending addresses to all the terminal stations tends to dominate the total available time.

In the probing method, the polling station initially queries stations in groups, then probes subgroups of smaller and smaller sizes if positive acknowledgements are received from terminals in the group indicating that messages are stored thereat and eventually addresses individual terminal stations in the probed subgroups to collect the messages. In lightly loaded periods, the central station does not probe into those groups or subgroups of remote terminal stations which have no messages to send and thus sends only a limited number of queries. However, in heavily loaded periods where a substantial number of the stations have available messages to send, the polling staton sends both group and individual queries and the total polling time for both probing for acknowledgements and addressing individual terminals to collect the messages would exceed the polling time in a system using the polling method.

Accordingly, it is an object of this invention to reduce the proportion of available time required for polling (and probing). More specifically, it is an object of this invention to decrease the proportion of polling time in systems having both lightly loaded and heavily loaded periods.

Summary of the Invention

In accordance with the objects of this invention, the quantity of messages collected in a polling (and probing) sequence controls which one of the remote station group (or subgroup) sizes is to be initially queried in the next polling sequence. Advantageously, the quantity of messages collected is calculated by measuring the duration of polling (and probing) time required to collect the messages.

The size of the station group is advantageously calculated to be inversely related to the duration of polling time whereby during lightly loaded periods, as determined by short duration polling times, a larger size one of the station groups (in the extreme the largest size group constitutes all the terminals) is initially probed and during heavily loaded periods, as determined by long duration polling times, a smaller size one of the station groups (in the extreme the smallest size constitutes an individual remote terminal) is initially addressed.

The foregoing and other objects and features of this invention will be more fully understood from the following description of an illustrative embodiment taken in conjunction with the accompanying drawings.

Detailed Description

Figure 1:
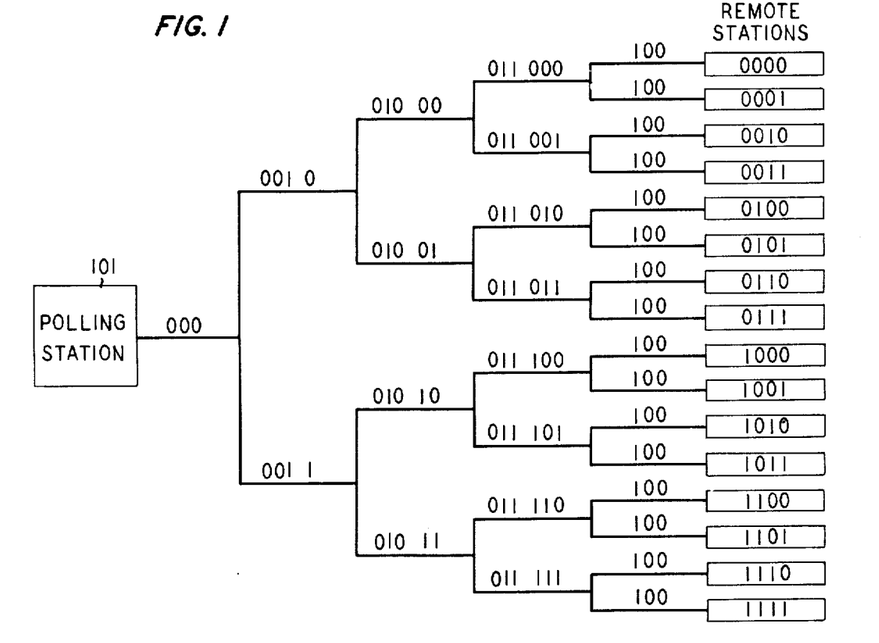
FIG. 1 discloses, in block form, a multiple terminal station message collection system.

The polling system shown in FIG. 1 comprises polling station 101 and a plurality of remote stations which, in this specific embodiment, number 16 and are identified by the binary numbers 0000 to 1111. Polling station 101 is interconnected with the remote stations by way of a two-way transmission line arranged to form a multiparty line. Transmission of data signals may be broadcast from polling station 101 to all the remote stations and may be transmitted from any remote station to polling station 101.

The present invention is embodied in a message collection system wherein polling station 101 collects messages from the various remote stations as part of the collection process. Polling station 101 sends polling words to the remote stations, certain of the polling words being directed to groups of remote stations to simultaneously query these stations whether they have messages thereat. Other polling words are directed to individual remote stations to instruct the remote station to send a message thereat to the polling station.

Each polling word comprises two portions, namely a polling level number and an address number. Each remote station is selected by an individual address number which comprises a binary number that advantageously may be identical to the identifying binary number of the remote station as seen in FIG. 1. In general, the level number of the polling word designates how many bits of the remote station address number starting with the most significant bit is to be examined by the selection apparatus at the remote station. This has the effect, as further described below, of dividing the remote stations into groups and subgroups of various sizes.

The message collection system of FIG. 1 is a probing system wherein the polling station queries groups of remote stations and, in the event that an acknowledgement is received from a group, proceeds to probe the group by calling smaller and smaller subgroups until the individual remote station acknowledging the probe is called whereupon this remote station returns the message stored thereat. The polling station has the capability of probing all the remote stations simultaneously; all of the stations thus comprises the largest station grouping. To accomplish this the polling station sends the polling word 000 XXXX. The initial three "0" bits of the polling word comprises the polling level number and this number 000 is the highest polling level number and designates that all stations are being probed. The next four bits comprises tge address number, the X's denoting "don't care" bits that can be either "1" bits or "0" bits since the level number indicates that all stations are being probed. All remote stations in response to this probe word are arranged to return an acknowledgement in the even that the stations have messages stored.

In the next largest grouping (designated by poll level number 001) the stations are divided into two groups of eight stations, one of the two groups of stations comprising remote stations 0000 to 0111 and the other group comprising stations 1000 to 1111; it being noted that the one group has a "0" bit in the most significant bit position and the other group has a "1" bit in the most significant bit position. FIG. 1 is arranged to emphasize this grouping; specifically, the transmission line portion or leg designated 001 0 extends to its right to all of the statons in the "0" bit group and the lower portion or leg of the line designated 001 1 extends to its right to all of the stations in the "1" bit group. To probe these groups polling station 101 sends the poll codes 001 0XXX and 001 1XXX. The poll level number 001 instructs the selection apparatus at the remote stations to examine the most significant bit of the station address number and this has the effect of separately probing the group of eight stations where the most significant bit is "0" and the group of eight stations where the most significant bit is "1".

In a corresponding manner, groups of four stations can be probed with a polling word having level number 010 whereby the two most significant bits of the address number are examined. Thus polling word 010 00XX selects the group of remote stations 0000 through 0011. Similarly, polling level number 011 in the poll word instructs the remote stations to examine the three most significant bits of the address number and polling level number 100 in the poll word instructs the stations to examine all of the bits of the address number and, as previously noted, in the latter case the individual remote station thus addressed returns the message stored thereat.

A polling sequence comprises a collection process started by the issuance of an initial polling word and terminated when all acknowledgements and available messages are collected from the remote stations. In accordance with this invention, polling station 101 is arranged to start polling at a calculated polling level depending upon the quantity of message traffic. More particularly, as described hereinafter, polling station 101 determines the quantity of message traffic by measuring the duration of time required to complete a polling sequence and, utilizing this measurement, calculates the polling level number for the intial polling word of the next polling sequence.

In a system of $2^n$ stations the number of remote stations probed by the initial poll word is defined by the number $2^k$, where $k$ cannot be greater than $n$ or less zero and should optimally equal the largest integer which does not exceed a variable $j$. We have determined that $j$ is satisfied by the following relationship:

$$j + 1 > -\log_2(\lambda T/\ln 2) \geq j \quad (1)$$

where $\lambda$ comprises the message arrival rate for the average remote terminal station and is more specifically defined as messages available for transmission at each terminal station per second and T is the time duration, in seconds, to complete a polling sequence. Solving for T we derive the relationship:

$$\ln 2/\lambda \, [2^{-(j+1)}] < T \leq \ln 2/\lambda \, 2^{-j} \quad (2)$$

The message arrival rate for the stations constitutes a parameter which can be determined for a system and thus would constitute a constant. Accordingly, it can be seen in Equation 2 that $j$ and therefore $k$ (and thus the remote station group size polled by the initial polling word in a polling sequence) is inversely related to the variable T which in turn is related to the quantity of messages in the system. As described in detail hereinafter, polling station 101 measures the duration of a polling sequence and calculates a new remote station group size, in accordance with the algorithm expressed in Equation (2), to provide the initial poll word in the subsequent polling sequence.

Polling station 101 may start a polling sequence by sending the poll word at level number 000 which probes all the remote stations. If none of the remote stations has a message, no acknowledgement is received and this will terminate a sequence. The duration of the sequence is therefore very short, indicating very light system loading where it is advantageous to start at the highest poll level such as level 000 rather than poll each of the remote stations. Polling station 101 accordingly measures the polling sequence interval and at the termination of the sequence calculats a new remote station group size. Since the completed sequence was very short, the new group size will constitute all the stations and the new poll word levwel number is again 000.

If one or more of the remote stations have a message, an acknowledgement to the poll word is received and polling station 101 thereupon stores the acknowledged poll word. The polling station is thereupon arranged to sequentially send the two poll words of the next lowest level, which in this case is level number 001, storing the poll word if an acknowledgement is received and discarding the poll word if there is no acknowledgement. After sending the two poll words at level 001, the polling station obtains the last stored polling word and repeats the above process by sending the two poll words, at the next highest level, which are directed to the two subgroups of the acknowledged poll word. Thus, if poll words 001 0XXX and 001 1XXX are acknowledged, or only poll word 001 1XXX is acknowledge, then in either event polling station 101 continues the polling sequence by sending polling words 010 10XX and 010 11XX. If acknowledgements to one or both of these latter poll words are received, polling station 101 stores the acknowledged poll words and again proceeds to send poll words at the next lowest level directed at the two subgroups of this last acknowledge poll word. This process is continued, storing the acknowledged poll words and continuing probing until the individual remote station having the messages is queried to collect the message from the remote station. The polling sequence then continues by reading any other acknowledged poll words out of storage and probing into the two subgroups thereof to collect other messages until all of the subgroups of stations queried by acknowledged poll words have been probed and all available messages in the remote stations have been collected.

After the last message has been collected, the polling sequence is terminated and polling station 101 utilizes the measurement of the polling sequence time duration to calculate the polling level number of the initial poll word of the next polling sequence. Since we have assumed that the system is relatively heavily loaded, a lower poll level such as level 010 may be calculated. In accordance therewith, polling station 101 initiates the new polling sequence by sending first the poll word 010 00XX and follows with the other three poll words at this level; namely, 010 01XX, 010 10XX and 010 11XX. In the same manner as described above, if one or more of the remote stations have messages, acknowledgements will be received and the acknowledged poll words are stored by polling station 101, which then proceeds to probe subgroups of stations designaged by the acknowledged poll word which has been stored last, probing down to the individual stations and collecting the messages therefrom and thereafter returning to the other acknowledged poll words priorly stored to probe into the subgroups to collect messages from those stations. Accordingly, successive polling sequences are provided; each polling sequence starting with an initial poll word which is directed to a group of stations whose size is inversely related to the loading of the system, wherein during a very lightly loaded period the sequence starts at the highest level 000 and wherein during a very heavily loaded period, the sequence starts at the lowest poll level 100, at which level each station is individually polled.

Figure 2:
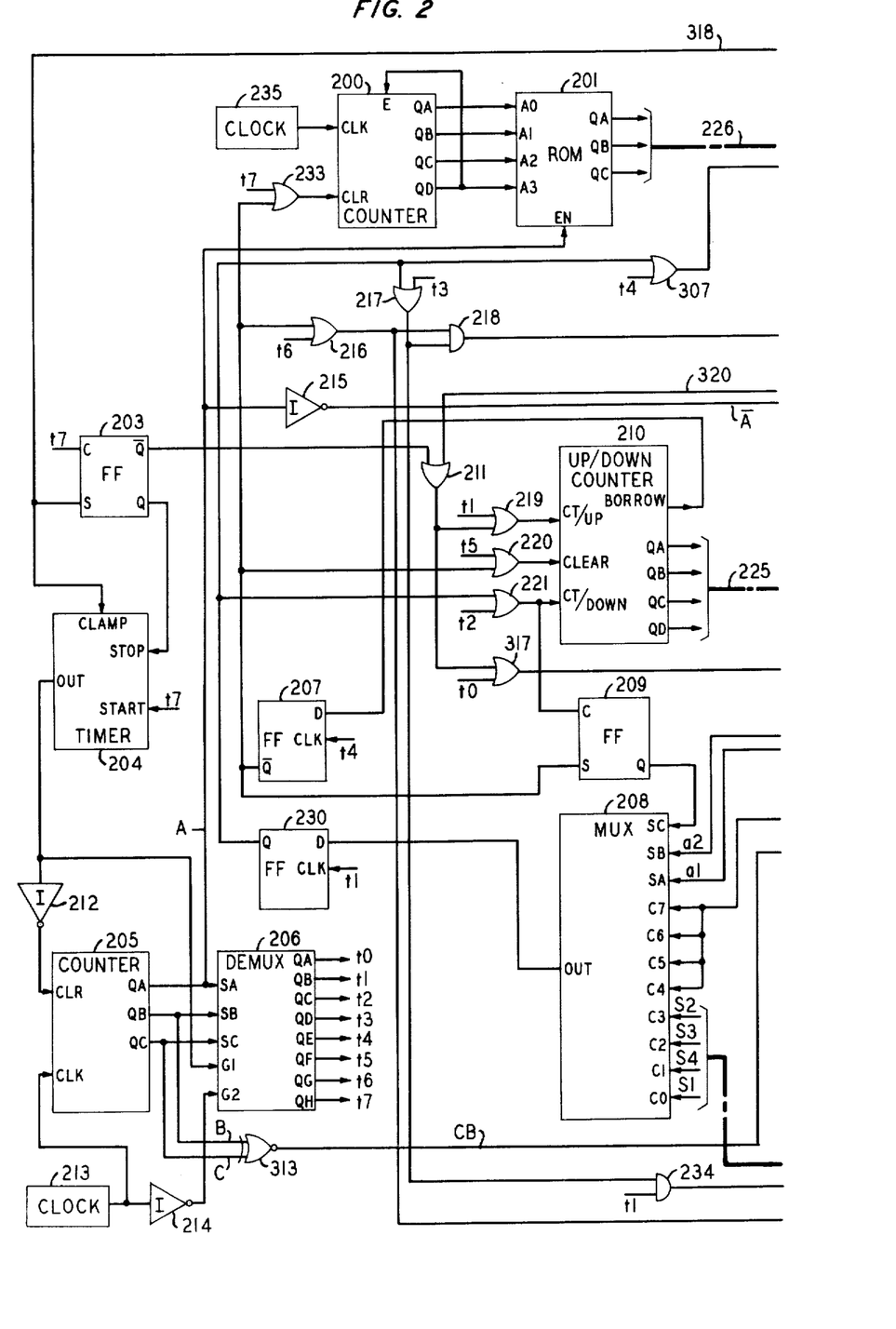
FIGS. 2 and 3, when arranged as shown in FIG. 4, show in schematic form the various circuits which form a central polling station which polls the terminal stations in accordance with this invention.

The various states of each poll word cycle are defined by demultiplexer 206 and counter 205 under control of clock 213 in FIG. 2. To start the poll word cycle, counter 205 is controlled, as described hereinafter, to start from an initial binary count of 000 and thereafter to advance, in response to clock pulses from clock 213, to the binary count of "7" (111) at which point the counter stops advancing, the poll word cycle has passed through all the various states and the cycle ends.

The binary number output of counter 205 is provided at output terminals QA, QB and QC, which terminals are connected to leads A, B and C and leads A, B and C, in turn, extend to input terminals SA, SB and SC of demultiplexer 206. Demultiplexer 206, when enabled by high potentials on input terminals G1 and Gs, as described hereinafter, provide a negative pulse to an individual one of output terminals QA through QH, as defined by the binary number applied to the demultiplexer. Thus, when binary number 000 is applied to the input terminals, a negative pulse is passed to output terminal QA. When binary number 001 is applied, a negative pulse is passed to terminal QB and so on. Terminals QA through QH are connected to leads T0 through T7 and a pulse to any one of these leads during the poll word cycle is hereinafter called a timing pulse; the timing pulse on lead T0, for example, being called the T0 timing pulse and the timing pulse on any other lead being correspondingly identified.

Read-only memory (ROM) 201 provides the calculation of the initial polling level number for the new polling sequence in accordance with Equation (2) which, as previously described, sets forth the algorithm which is dependent on a measure of the terminal arrival rate for the system and the duration of the proceeding polling sequence. ROM 201 comprises a look-up table which stores 3-bit level numbers at storage locations or addresses therein, each address comprising a 4-bit number applied to input terminals A0 through A3. A measure of the system arrival rate and duration of the preceding polling sequence is obtained from counter 200 which is reset or cleared to the initial binary count at the beginning of each polling sequence, as described hereinafter, and is thereafter advanced by clock 235 until it achieves a binary count of 1000, at which time the most significant bit of this binary count removes the enabling potential applied to input terminal E thereof to preclude further advancement. The 4-bit output number of counter 200 is applied to input terminals A0 through A3 of ROM 201 and thus comprises the address number for the ROM. Readout of the stored level number in ROM 201, thus addressed by counter 200, is enabled in response to a low condition on lead A applied to input terminal EN of ROM 201, the level number being read out of terminals QA through QC.

In the present system we assume a system loading of messages for collection, which system loading may be assumed to be $2/10^{ths}$ messages per poll time. A reasonable expectation of polling time for each terminal station which includes the time for issuance of a poll word by the polling station plus the turn around time to receive and act on the response can reasonably be expected to be 50 milliseconds. Accordingly, in this 16 station system, we then calculat Thus,
$$\lambda = \frac{.2}{16(50)(10^{-3})} = .25 .$$

$$\frac{\ln 2}{\lambda} = \frac{.69}{.25} = 2.76 .$$

In a 16 station system, the number of stations in the group queried by the first poll word in the sequence (defined as $2^k$) cannot be greater than 16 and thus $k$ cannot be greater than 4; the number of stations in the group cannot be less than 1 and $k$ cannot be less than 0. We substitute the value of 2.76 for $\ln 2/\lambda$ in Equation (2) and define $k$ with the above restraints and find that where:

| | | | | | | |
|---|---|---|---|---|---|---|
| $\frac{2.76}{2}$ | < | T | | | k = | 0 (level 100) |
| $\frac{2.76}{4}$ | < | T | ≦ | $\frac{2.76}{2}$ | k = | 1 (level 011) |
| $\frac{2.76}{8}$ | < | T | ≦ | $\frac{2.76}{4}$ | k = | 2 (level 010) |
| $\frac{2.76}{16}$ | < | T | ≦ | $\frac{2.76}{8}$ | k = | 3 (level 001) |
| | | T | ≦ | $\frac{2.76}{16}$ | k = | 4 (level 000) |

In view of the above calculations, the period of clock 235 is set at 2.76/16 or 0.17 seconds. The specific level numbers which are advantageously stored in accordance with these calculations are thus set forth in Table I below:

TABLE I

| INPUT COUNT | OUTPUT LEVEL NUMBER |
|---|---|
| 0000 | 000 |
| 0001 | 001 |
| 0010 | 010 |
| 0011 | 010 |
| 0100 | 011 |
| 0101 | 011 |
| 0110 | 011 |
| 0111 | 011 |
| 1000 | 100 |

Figures 3, 4:
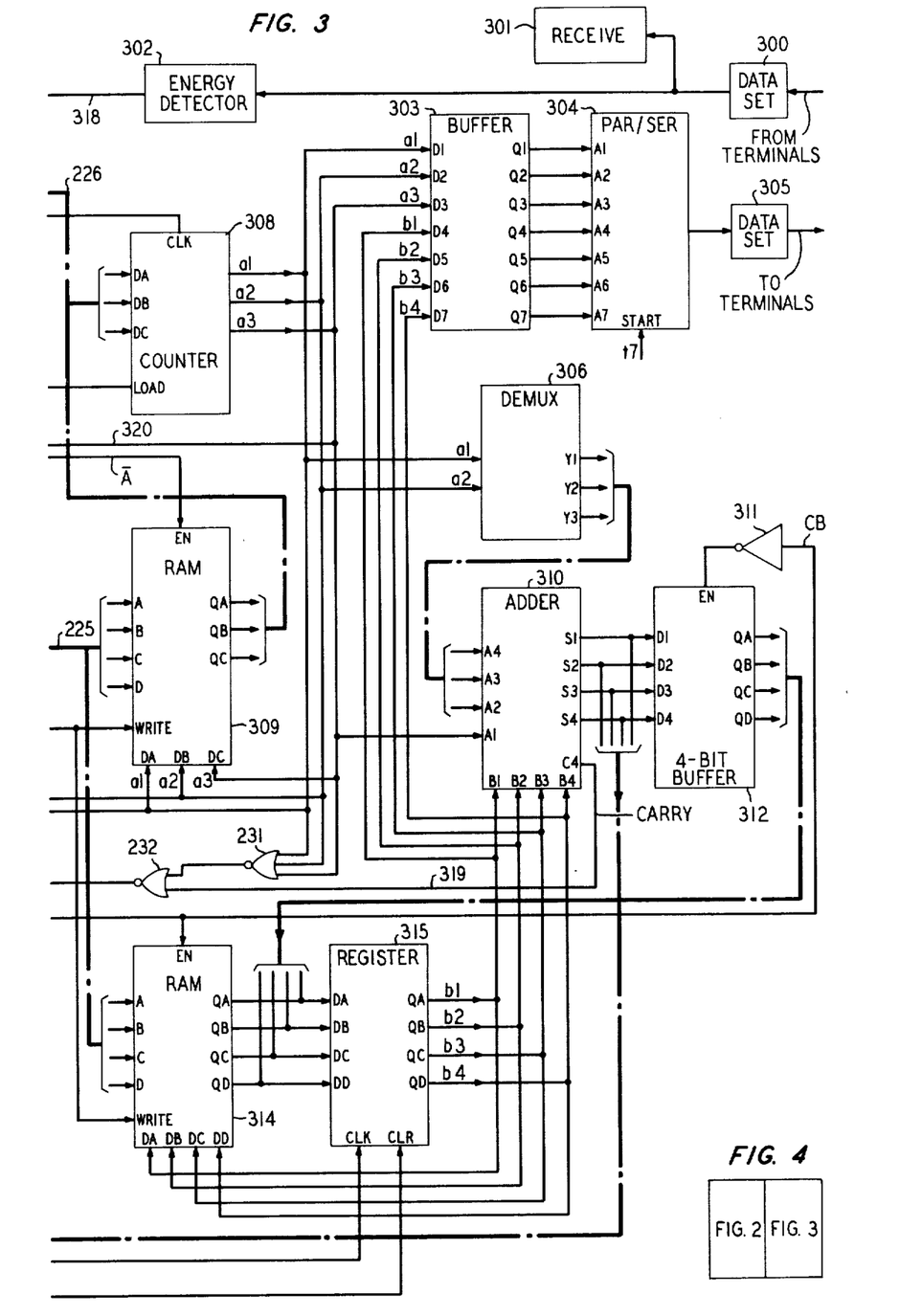

The level number for the present poll word cycle is stored in counter 308. Counter 308 is arranged to load a level number presented to input terminals DA to DC of counter 308 in response to a negative pulse applied to input terminal LOAD. A negative pulse applied to input terminal CLOCK results in incrementing the level number by a count of "1". The level number in counter 308 is presented to output terminals QA through QC and passed to leads a1 through a3.

The station address number for the present poll word cycle is stored in register 315. The number presented at input terminals DA through DD is clocked into the register in response to a negative pulse passed to input terminal CLOCK. Address number "0000" is overwritten into the register in response to a negative pulse applied to input terminal CLR. The station address number stored in the register is presented to output terminals QA through QD and thereby passed to leads b1 through b4.

The station address number for the next poll word cycle (when a calculation is called for as described hereinafter) is calculated by demultiplexer 306 and adder 310. The 4-bit station address number on leads b1 through b4 are presented to input terminals B1 through B4 of adder 310 to constitute one number to be added (input terminal B1 constituting the least significant input bit of the number). Lead a3, which provides the most significant bit of the level number stored in counter 308, is connected to input terminal A1 of adder 310, which input terminal constitutes the least significant bit of the other number to be added. The three most significant bits of this other number are derived from output terminals Y1 through Y3 of demultiplexer 306 and applied to input terminals A2 to A4 of adder 310. Input terminals SA and SB of demultiplexer 306 are connected to leads a1 and a2.

Demultiplexer 306, which is permanently enabled, provides output bits on terminals Y1 through Y3 in accordance with Function Table II set forth below:

FUNCTION TABLE II

| SA | SB | $Y_1$ | $Y_2$ | $Y_3$ |
|----|----|----|----|----|
| 0 | 0 | 0 | 0 | 0 |
| 1 | 0 | 1 | 0 | 0 |
| 0 | 1 | 0 | 1 | 0 |
| 1 | 1 | 0 | 0 | 1 |

Referring to Table II and the connections to the inputs of adder 310, it can be summarized that; when counter 308 stores level number 001, a "1" bit is added to the most significant bit position of the station address number; when counter 308 stores level number 010, a "1" bit is added to the next most significant bit position of the station address number; when counter 308 stores level number 011, a "1" bit is added to the third most significant bit of the station address number; and when counter 308 stores the lowest level number (fourth level 100), a "1" bit is added to the least significant bit of the station address number. The effect of this calculation will be more apparent hereinafter. The output number of adder 310 is provided at terminals S1 to S4. If the calculated number exceeds the maximum number these terminals can carry, a carry output is passed to output terminals C4.

Random address memory (RAM) 309 stores the level number portion of a poll word when a positive acknowledgement to the poll word is received from a remote station. Ram 314 stores the station address number portion of the poll word when The poll word is acknowledged by the remote station.

The address number defining the storage location in RAMS 309 and 314 which is to be written into or read out of is provided by up/down counter 210. Up/down counter 210 is cleared to an initial binary "0000" count in response to the application of a negative pulse to input terminal CLEAR. The counter is incremented by each negative pulse to input terminal CT/UP and is decremented by each negative pulse to input terminal CT/DOWN. A positive condition is passed to output terminal BORROW if the counter is decremented below the binary count of "0000". The number stored by the counter is presented to output terminals QA through QD and is passed through multiple leads 225 to input terminals A through D of RAMS 309 and 314 and constitute the address number.

A negative pulse applied to input terminal WRITE of RAM 309 stores the level number presented by leads a1 through a3 to input terminals DA through DC of RAM 309 into the address location defined by the output number of counter 210 and similarly a negative pulse applied to input terminal WRITE of RAM 314 stores the station address number presented by leads b1 through b4 to input terminals DA through DD into this same address location in RAM 314. A negative condition applied to input terminal EN reads out the level number at the address defined by counter 210 to output terminals QA through QC of RAM 309 and reads out the station address number at this same address defined by counter 210 to output terminals QA through QD of RAM 314.

The output level number of counter 308 on leads a1 through a3 and the output station address number of register 315 on leads b1 through b4 are passed to input terminals D1 through D7 of buffer 303. Buffer 303 thereby forms a word which is composed of the level number and station address number. This word is passed by buffer 303 to input terminals A1 through A7 of parallel-to-serial converter 304.

As described hereinafter, the T7 timing pulse is provided by demultiplexer 206, at the end of each poll word cycle. This T7 timing pulse clears flip-flop 203, starts timer 204 and initiates the operation of parallel-to-serial converter 304. Timer 204, when timing, changes its normally high output to a low condition. This low condition clears counter 205 to the initial binary count of "0" and provides a disabling potential to terminal G1 of demultiplexer 206. Parallel-to-serial converter 304 provides to data set 305 an initial start bit, serially followed by seven bits corresponding to the information provided to input terminals A1 through A7, which eight serial bits make up the poll word. This poll word is converted by data set 305 to line signals which are broadcast to all the remote stations.

The remote stations selected by the level number and the station address number in the poll word are activated, as described hereinafter, to either respond with an acknowledgement word in the event that there is a message available thereat or to withhold response if there is no message available thereat. If an acknowledgement word is returned, it is received by data set 300, which passes the word to energy detector 302. Energy detector 302 in response to the energy of the response word lowers its normally high output. This low condition momentarily clamps the timing operation of timer 204 and, in addition, sets flip-flop 203. The termination of the acknowledgement word restores the high output condition of detector 302, removing the clamp from timer 204 and flip-flop 203 stops the timer operation.

If no acknowledgement word is received from the remote stations, flip-flop 203 remains cleared and timer 204 is neither clamped nor stopped. In this event timer 204 continues to operate until it times out. In either event, whether or not an acknowledgement word is received, the stopping or timing out of timer 204 drives its output from the low condition during its timing to a high condition. The high condition output of timer 204 is passed to input terminal G1 of demultiplexer 206 to partially enable the demultiplexer. This is the condition necessary to start a new poll word cycle wherein, as described hereinafter, the T0 to T7 timing pulses are generated in sequence.

In the event that an acknowledgement word is received from the remote stations and flip-flop 203 is thereby set, the low condition from the Q output terminal of flip-flop 203 is passed through OR gate 211 to enable OR gates 219 and 317. The enabling or OR gates 317 permits the passage of the T0 timing pulse therethrough and this negative pulse is thereby passed to the WRITE inputs of RAMS 309 and 314 whereby, as described in detail hereinafter, the level number and the station address number of the acknowledged poll word is written into the RAMS. The subsequent T1 timing pulse generated by demultiplexer 206 is passed through OR gate 219 and passed to input terminal CT/UP of counter 210 to thereby increment the counter which, in turn, increments the address number applied to RAMS 309 and 314. Thus, it is seen that an acknowledgement response from the remote stations stores the appropriate level number and station address number in the RAMS and increments counter 210 to prepare a new address for the RAMS and to indicate, as descrebed hereinafter, that information is stored in the RAMS.

Multiplexer 208 together with flip-flop 230 determine whether the next poll word in the polling sequence should be calculated by adder 310 or obtained from the RAMS. Multiplexer 208 is arranged to satisfly Function Table III set out below:

FUNCTION TABLE III

| $S_C$ | $S_B$ | $S_A$ | OUTPUT IS OBTAINED FROM |
|---|---|---|---|
| 0 | 0 | 0 | $C_0$ $(S_1)$ |
| 0 | 0 | 1 | $C_1$ $(S_4)$ |
| 0 | 1 | 0 | $C_2$ $(S_3)$ |
| 0 | 1 | 1 | $C_3$ $(S_2)$ |
| 1 | 0 | 0 | $C_4$ |
| 1 | 0 | 1 | $C_5$ |
| 1 | 1 | 0 | $C_6$ |
| 1 | 1 | 1 | $C_7$ |

The input for input terminal SC of multiplexer 208 is provided by output terminal Q of flip-flop 209. As described hereinafter, flip-flop 209 is set when the polling station is sending poll words at the initial level of the polling sequence. Accordingly, when a new polling sequence is started, the Q output of flip-flop 209 applies a "1" bit to input terminal SC of multiplexer 208.

The inputs for terminals SA and SB of multiplexer 208 are provided by leads a1 and a2 which carry the two least significant bits of the level number output of counter 308. The inputs for terminals C0 through C3 are provided by leads S1 through S4 which carry the station address number generated by adder 310, with the least significant bit on lead S1 passed to input terminal C0, the next least significant bit on lead S2 passed to terminal C3, the third least significant bit on lead S3 passed to input terminal C2 and the most significant bit on lead S4 applied to terminal C1. Input terminals C4 through C7 are coupled together and are connected to the output of NOR gate 232. As described hereinafter, the output of NOR gate 232 is normally high and goes low only in the event that the initial binary level number output of counter 308 is 000 or in the event that a carry output at output terminal C4 is obtained from adder 310.

Finally, the output of multiplexer 208 is passed to the D input of flip-flop 230.

Examining Function Table III, it is seen that when a new polling sequence starts and flip-flop 209 is set, the input to terminals C4 through C7 of multiplexer 208 is invariably passed to the output thereof and thus to the D input of flip-flop 230. Assuming the output of NOR gate 232 is normally high, the input to flip-flop 230 is therefore correspondingly high and during each poll word cycle the T1 timing pulse clocks the flip-flop to the set condition. With flip-flop 230 in the set condition there will be no change in the level number stored in counter 308 and the next station address number stored in register 315 is obtained from adder 310 by way of buffer 312, as described in detail hereinafter.

After all of the poll words for the initial level of the polling sequence have been transmitted (it being realized that for the level number 000 there is only one poll word), the output of NOR gate 232 goes low, as described in detail hereinafter, and this low condition is now passed by multiplexer 208 to the D input of flip-flop 230. The T1 timing pulse of the next poll word cycle thereupon clears the flip-flop. Under this condition the polling station reads out the last level number and station address number stored in RAMS 309 and 314 for storage in counter 308 and register 315. As further described hereinafter, the level number in counter 308 is incremented to store therein the next successive lower number. In the same poll word cycle, flip-flop 209 is cleared and multiplexer 208 alternately clears and sets flip-flop 230 after successive polls to alternately calculate the second address for the new incremented level number and then again read out the RAMS, repeating this two step cycle cycle until the lowest level number is reached and the message is obtained from the remote station whereby the polling station is enabled to proceed down the tree shown in FIG. 1 in the manner previously described.

A polling sequence is completed when there has been no positive acknowledgement from a station in response to the sending of all the polling words available at the initial level of the polling sequence or, alternatively, when messages have been collected from all stations which responded that there were messages thereat.

Assume first that all the polling words available in the initial level (of poll words) in the polling sequence has been transmitted without any stations responding that they have a message thereat. In this event, counter 210 has not been advanced and is therefore still at the binary count of "0000". During the last poll word cycle for the initial level, the highest numbered station address for the level was sent. This number is therefore stored in register 315. Adder 310 is calculating the new station address number which, since it is higher than the highest number available at its output, results in the generation of a CARRY pulse. This CARRY pulse is passed to NOR gate 232 which, in turn, provides a negative condition to input terminals C4 through C7 of multiplexer 208. Since the initial level was polled, flip-flop 209 is set, and a "1" bit is passed to input terminal SC of multiplexer 208. As seen in Function Table III, the low condition on input terminals C4 through C7 is passed to the D input of flip-flop 230. Flip-flop 230 is cleared by the T1 timing pulse in the new poll word cycle and this provides a low output condition. This low output condition of flip-flop 230 enables OR gates 221, 217 and 307.

When the T2 timing pulse is generated by demultiplexer 206, the pulse is passed through OR gate 221 to decrement counter 210 and to clear flip-flop 209 (under this condition flip-flop 209 will perform no function at this time). Since counter 210 is presently at the binary count of "0000", the decrementing of the counter produces a positive condition at the borrow output of counter 210 which is passed to the D input of fli-flop 207.

When the T4 timing pulse is generated, it clocks flip-flop 207 to the reset condition and this signals the resetting of the polling station to start a new polling sequence. The setting of flip-flop 207 provides a low output condition and this low condition sets flip-flop 209 and enables OR gates 220, 216 and 233. The T5 timing pulse is passed through OR gate 220 to clear counter 210 back to the binary count of "0000". The subsequent T6 timing pulse is passed through OR gate 216 to clock the level number calculated by ROM 201 into register 202 thereby storing a newly calculated initial level number into the register, it being noted that, while the T6 pulse is generated, counter 205 is applying a low condition to lead A to enable the readout of ROM 201. At the same time, the T6 timing pulse passed through OR gate 216 is also applied through AND gate 218 to load this same level number into counter 308. Finally, the T6 timing pulse passed through OR gate 216 is applied to the clear input of register 315 to write in the lowest station address number 0000. Finally, the T7 timing pulse is passed through OR gate 233 to clear counter 200 back to the initial binary count of "0000". At this time, of course, the T7 pulse also clears flip-flop 203, starts timer 204 and initiates the operation of timer 204, as previously described, whereby the first poll word of the new poll sequence is transmitted.

If the polling sequence just completed without an acknowledgement had an initial level number 000, all outputs of counter 308 comprise "0" bits. This enables NOR gate 231 and the gate passes a "1" bit to NOR gate 232. NOR gate 232 thereupon passes a "0" bit to input terminals C4 through C7 of multiplexer 208. Since, at the start of the polling sequence, flip-flop 209 is set passing a "1" bit to the SC input terminal of multiplexer 208, the "0" bit applied to input terminals C4 through C7 is passed to input terminal D of flip-flop 230. When the T1 timing pulse is generated, the flip-flop is placed in the clear condition, as previously described. When the T2 timing pulse is generated, the decrementing of counter 210 provides a borrow output and flip-flop 207 is subsequently clocked to the set condition to thereby indicate the starting of a new polling sequence.

Assume now that a polling sequence has been completed and, in response to timing pulse T6, a new level number calculated by ROM 201 is loaded into counter 308. Further assume that this calculated level is level 2 (binary levels 010) and finally assume that four stations will respond that messages are available thereat; namely, stations having addresses 0110, 1001, 1010 and 1011.

As previously described, at the end of a polling sequence, register 315 is cleared during the T6 timing pulse interval and the clearing of the register provides "0" bits to output terminals QA through QD and thus applied station address 0000 to buffer 303 and adder 310. The T7 timing pulse now starts timer 204, clears flip-flop 203 and starts parallel-to-serial converter 304. The new level number 010 and the new address OOXX (where X is a "don't care" digit for reasons previously explained) are therefore serially transmitted by data set 305 to the remote station. At the same time, the T7 timing pulse clears counter 200 since flip-flop 207 was previously set during the last poll of the prior sequence by the borrow output of counter 210, as previously described and the setting of flip-flop 207 enables OR gate 233.

None of the OOXX stations have messages in accordance with the assumed facts and no response of the polling word is received. Flip-flop 203 is maintained in its clear condition and timer 204 times out after the appropriate interval. The time out of timer 204 removes the clear clamp from counter 205 and the counter is advanced by clock 213 to provide high and low conditions during various counts to leads A, B and C. Timer 204 and clock 213 (via inverter 214) pass high conditions to input terminals G1 and G2 of demultiplexer 206 thereby enabling the demultiplexer which will now produce the T0 to T7 timing pulses of the new poll word cycle. At this time it is to be noted with level 010 being generated by counter 308 and address 0000 being generated by register 315, adder 310 produces the next address number 0100 at its output terminals S1 through S4.

When the T0 timing pulse is generated, it is blocked by gate 317, since no response was received from the remote stations, flip-flop 203 was thereby maintained in the clear condition, and a high condition is applied to gate 317 by way of OR gate 211. Accordingly, no information is written into RAM 309 and RAM 314 indicating the absence of the response of the remote stations.

When the T1 timing pulse is generated, OR gate 219 blocks its application to the count-up input terminal of counter 210 since the gate is disabled by OR gate 211. At the same time, a high condition is being applied by NOR gate 232 to input terminals C4 through C7 of multiplexer 208, since the C4 carry output of adder 310 is low (a carry is not being generated for this address) and the output of NOR gate 231 is also low (since this output is low for all level numbers with the exception of level 0). At the same time, a high condition is applied to input terminal SC of multiplexer 208 since flip-flop 209 was previously set by the clearing of flip-flop 207 during the last poll word cycle of the prior polling sequence. With the high condition on input terminal SC of multiplexer 208, the "1" bit applied to input terminals C4 through C7 is read to the output and passed to the D input of flip-flop 230. The flip-flop is thereby clocked to the set condition by the T1 timing pulse providing a high condition to its output. This disables OR gates 221, 217 and 307.

Finally, the T1 pulse is passed through gate 234 to load the address applied to input terminals DA through DD. Since, when the T1 timing pulse is generated, leads C and B are low, the output of exclusive NOR gate 313 is high and the output of inverter 311 is low. The latter low condition enables buffer 312 to apply the output address of adder 310 to register 315 (while gate 313 disables the readout of RAM 314). Accordingly, the new address 0100 produced by adder 310 is loaded into register 315.

When timing pulses T2 and T3 are generated, they are blocked by OR gates 221 and 217, which OR gates are disabled, as previously described. When timing pulse T4 is generated, OR gate 307, disabled, blocks the passage of the pulse to counter 308. The T4 timing pulse changes the condition of flip-flop 207 to the clear condition (since the borrow output of counter 210 is now low due to the T5 timing pulse clearing counter 210 after the decremented counter had produced the borrow pulse at the end of the polling sequence). Flip-flop 207 in the clear condition is now disabling OR gates 220, 216 and 233, as previously described. Accordingly, the T5 pulse is thereby blocked by OR gate 220 to preclude clearing of counter 210. The T6 timing ulse is similarly blocked by OR gate 216 to preclude the registration of a new level number into counter 308 and the clearing of register 315.

When the T7 timing pulse is generated, it is blocked by gate 233, precluding the clearance of counter 200. In addition, the T7 pulse starts the operation of parallel-to-serial converter 304 whereby the polling word 010 01XX (as provided by counter 308 and register 315) is sent to the remote station and, as previously described, clears flip-flop 203 (flip-flop 203 is presently cleared at this time) and starts timer 204.

In response to the poll word, station 0110 sends back its response word and energy detector 302 sets flip-flop 203. When energy is no longer present, the clamp is removed from timer 204 and flip-flop 203 stops timer 204 and a new polling cycle is thereby initiated. The setting of flip-flop 203 results in the application of a low condition to OR gate 211 and this enables OR gates 219 and 317.

The T0 timing pulse, when generated in the new polling cycle, is passed through OR gate 317 to the WRITE inputs of RAMS 309 and 314. At this time, the address number output of counter 210, being previously cleared, is 0000 and this address is passed to the A, B, C and D input terminals of RAMS 309 and 314. Accordingly, the level number 010 derived from counter 308 is written into RAM 309 and the address number 0100 derived from register 315 is written into RAM 314, both numbers being written into address 0000 of the RAMS. Thus, the level 010 is written into RAM 309 and the station address number 0100 is written into RAM 314.

The T1 pulse is applied to the clock input of flip-flop 230 which was priorly set, as previously described. Since the new station address number 1000 calculated by adder 310 has not resulted in a carry output and further since the output number of counter 308 is not 000, NOR gate 232 is applying a high condition to input terminals C4 through C7 of multiplexer 208. Flip-flop 209, still being set, applies a high condition to input terminal C4 of multiplexer 208 which passes the high condition on input terminals C4 through C7 to the D input of flip-flop 230. The T1 timing pulse thereby maintains the flip-flop in the set condition, maintaining OR gates 221, 217 and 307 disabled.

The T1 timing pulse is also passed through OR gate 219 and counter 210 advances to the counter of 0001. The T1 pulse is also passed through gate 234 to register 315. At this time, counter output leads B and C are low. Exclusive NOR gate 313 is applying a disabling potential to terminal EN of RAM 314 and inverter 311 is applying an enabling potential to terminal EN of buffer 312. Register 312 clocks in the new address number from buffer 312 which adder 310 has calculated to be 1000 in the manner previously explained. With the new address 1000 in register 315, adder 310 calculates the next address number 1100.

During the subsequent timing pulses T2, T3, T4, T5 and T6, no change occurs as described for the previous poll word cycles. The T7 timing pulse now sends out the new poll word in the same manner, as previously described, clears flip-flop 203 and starts timer 204. At this time, the poll word 010 10XX is being transmitted to the remote station.

We have presumed that the stations having addresses 1001 and 1010 have messages thereat. These stations therefore respond and energy detector 302 therefore sets flip-flop 203. Timer 204 is therefore stopped to start a new poll word cycle and the output of OR gate 211 goes low indicating a station response has been received. The operation of counter 205 is now initiated and, when the T0 timing pulse is generated, the level number 010 is written into RAM 309 and the station address number 1000 is written into RAM 314 at the address of 0001 as defined by counter 210. The T1 timing pulses now advances the count of counter 210 to the count of 0010 since a station response has been received and OR gate 219 is enabled. The T1 timing pulse also toggles flip-flop 230 without changing the condition since the flip-flop is presently in the set condition and multiplexer 208 is still applying a high condition to the D input of the flip-flop for the same reasons described during prior poll word cycles. Finally, the new station address word at the output of buffer 312 is clocked into register 315 by the T1 timing pulse being passed through gate 234. This new address word, as previously noted, comprises the number 1100 and register 315 passes this new number to adder 310. Since the present level stored in counter 308 is 010, demultiplexer 306 provides a "1" bit to the next most significant bit position terminal A3 of adder 310 and adder 310 applies a "1" bit to the output carry (C4) terminal, which carry output of adder 310 will be utilized in the next poll word cycle.

No functions are provided by timing pulses T2, T3, T4, T5 and T6, as described for the previous poll word cycles. When timing pulse T7 is generated, parallel-to-serial converter 304 is started and the poll word 010 1100 is sent to the remote stations. Flip-flop 203 is also cleared and timer 204 is simultaneously started.

We have presumed that none of the stations having addresses with "1" bits in the two most significant bit positions have messages thereat. No response is therefore received from these stations to set flip-flop 203. Timer 204 therefore times out and OR gate 211 provides a low condition at its output. The time out of timer 204 starts counter 205, initiating the T0 timing pulse. Since no station has responded, OR gate 317 is disabled and no information is written into RAMS 309 and 314.

At this time, adder 310 applies a "1" bit to its carry output, as previously described. NOR gate 232 inverts this bit, thereby passing a "0" bit to input terminals C4 through C7 of multiplexer 208. With flip-flop 209 set, a "1" bit is passed to input terminal SC of multiplexer 208. The multiplexer thereby passes a "0" bit to the D input of flip-flop 230. The T1 timing pulse now clocks the flip-flop to the clear condition and the consequent low output at the Q terminal enables OR gates 221, 217 and 307. The T1 timing pulse also clocks a new address word into register 315 but this word will not be used since it will be overwritten before the poll word is sent to the remote stations. Finally, since no response was received from the stations and OR gate 219 is therefore disabled, the T1 timing pulse does not increment the count of counter 210 and the counter therefore remains at the count of 0010.

When the T2 timing pulse is generated, it is passed through OR gate 221. This now clears flip-flop 209 which therefore passes a "0" bit to input terminal SC of multiplexer 208. In addition, this output pulse of OR gate 221 decrements counter 210 to the count of 0001. When the T3 timing pulse is generated, it is passed through OR gate 217 and applied to gate 234 which is presently enabled by the high condition derived from lead A which is connected to the QB output of demultiplexer 306. The T3 timing pulse therefore loads register 315 with the number applied to terminals DA to DD. At this count of counter 205, output terminals QA and QB are providing high conditions to leads A and B and output terminal QC is provided a low condition. The output of exclusive NOR gate 313 is therefore low enabling the output of the station address word at address 0001 (as defined by counter 210) of RAM 314. As previously noted, the station address number stored in RAM 314 is number 1000, which number is loaded into register 315. It is noted that buffer 312 is presently disabled by the high condition applied thereto by inverter 311 to preclude entering the number supplied by adder 310 to register 315.

The T3 timing pulse is also passed through OR gate 217 and AND gate 218 to load a new level number into counter 308. At this time, as previously noted, lead A is high, disabling the output of ROM 201 and this high condition, inverted by inverter 215, and applied to input terminal EN of RAM 309, enables RAM 309. The level number at address 0001 (as defined by counter 210) in RAM 309, is therefore loaded into counter 308, which level number is 010. Accordingly, the level and station address numbers loaded into RAMS 309 and 314 due to the positive acknowledgement of a station to the poll word 010 10XX is now stored in counter 308 and register 315.

The T4 timing pulse is passed through OR gate 307 to increment counter 308 to a new level number 011. This constitutes the next lower level number and it is noted that demultiplexer 306, in response thereto, now applies a "1" bit to the next-to-the-least significant bit position terminal A2 of adder 310 and the consequent output number of adder 310 (to be used for the next poll word cycle) becomes 1010. No functions are provided at this time by the T5 and T6 timing pulses. The T7 timing pulse now starts a parallel-to-serial converter 304 and the poll word 001 100X is sent to the remote stations. At the same time, flip-flop 203 is again cleared and timer 204 is started.

We have presumed that the station having the address 1001 has a message thereat. It therefore sends back a response word setting flip-flop 203 which, in turn, stops timer 204 and lowers the output condition of OR gate 211. A new poll word cycle is therefore initiated and, since a response word is received, OR gates 219 and 317 are enabled. The T0 timing pulse enables the writing of level number 011 and station address number 1000 into address 0001 of RAMS 309 and 314, since, as previously described, counter 210 is presently at the count of 0001, level number 011 is presently stored in counter 308 and the 1000 station address number is presently stored in register 315.

Flip-flop 209, at this time, is cleared (as previously described) applying a "0" bit to input terminal SC of multiplexer 208. The level number output of counter 308 is passing "1" bits to input terminals SA and SB of multiplexer 208. Multiplexer 208 therefore gates the condition on input terminal C3 to the D input of flip-flop 230. This condition on terminal C3 is derived from output terminal S2 of adder 310 and the address at the output of adder 310 is 1010. The next-to-least significant bit on output terminal S2 is a "1" bit and this "1" bit is therefore passed to input terminal C3 of multiplexer 208 and then to the D input of flip-flop 230, whereby the T1 timing pulse places the flip-flop in the set condition to disable OR gates 221, 217 and 307. This, as previously described, precludes the loading or incrementing of counter 308 and the decrementing of counter 210. The T1 timing pulse is also passed through enabled OR gate 219 to advance counter 210 to the count of 0010 and the new address word 1010 calculated by adder 310 is passed through buffer 312 and clocked into register 315 since buffer 312 is now enabled by the high condition output of NOR gate 313 inverted and RAM 314 is disabled by this high condition.

The generation of timing pulses T2, T3, T4, T5 and T6 provides no functional change in the circuitry. When timing pulse T7 is generated, parallel-to-serial converter 304 is started and the poll word 011 101X is sent to the stations, flip-flop 203 is cleared and timer 204 started.

We have presumed that stations having addresses 1010 and 1011 have messages thereat. Both stations therefore simultaneously respond setting flip-flop 203 to thereby stop timer 204 and provide a low output through OR gate 211 to enable OR gates 219 and 317. A new poll word cycle is initiated and, when the T0 timing pulse is generated, the level number 011 and the station address number 1010 of the poll word transmitted to the stations and responded to by the two stations are written into RAMS 309 and 314 at address 0010, which RAM address is defined by the present count of counter 210.

The T1 timing pulse now advances counter 210 to the count of 0011. The next-to-the-least significant bit of the newly calculated address word (1100) at the output of adder 310 is a "0" bit, which is applied from output terminal S2 of adder 310 to input terminal C3 of multiplexer 308. Since the level is still level 011, "1" bits are applied to input terminals SA and SB of multiplexer 208 and the "0" bit on input terminal C3 is applied to the D input of flip-flop 230. The flip-flop is accordingly cleared by the T1 timing pulse to enabled OR gates 221, 217 and 307. At the same time, this newly calculated address word 1100 on the output terminals of adder 310 is passed through buffer 312 and clocked into register 315 by the T1 timing pulse passing through gate 234 (note that this value will be overwritten before it can have an effect).

The T2 timing pulse, when generated, passes through OR gates 221 to decrement counter 210 to the count of 0010. The T3 timing pulse passes through OR gate 217 and AND gate 218 to load into counter 308 the level number 011 derived from RAM 309 and passes through OR gate 217 and gate 234 to load into register 315 the address number 1010 derived from RAM 314, which numbers are located at the RAM address 0010, which address is determined by the count of counter 210. The T4 timing pulse is now passed through OR gate 307 to advance counter 308, providing a new level number at its output, which level number is 100 and constitutes the lowest level which defines the full 4-bit station address. Adder 310 now calculates the next address number 1011.

The T5 and T6 timing pulses provide no functions at this time. The T7 timing pulse, however, initiates the operation of parallel-to-serial converter 304 and the poll word 100 1010 is sent to the remote station. At the same time, flip-flop 203 is cleared and tmer 204 is started.

It has been presumed that the station having the address 1010 has a message thereat. The reception of the full poll word unique to that station initiates transmission of the message, as described in detail hereinafter. The energy of the message is detected by energy detector 302 to set flip-flop 203 and so long as the message is received timer 204 is clamped to preclude its timing out. At the same time, this message is received by receiver 301 which may constitute any conventional receiving apparatus including, for example, teletypewriters. After this message has been completed and energy therein is removed, the clamping action on timer 204 is similarly removed and the setting of flip-flop 203 stops the timer to initiate a new poll word cycle. At this time, at the lowest level, the most significant bit of the level is "1". This "1" bit is applied by counter 308 to output terminal QC and passed via lead a3 to OR gate 211. This simulates the absence of response and disables OR gates 219 and 317. The T0 timing pulse, however, is blocked by gate 317 to preclude writing information into RAMS 309 and 314. The T1 timing pulse is blocked by OR gate to preclude incrementing counter 210. At this time, adder 310 is providing address number 1011, as previously described. A "1" bit is therefore applied from output terminal S1 of adder 310, which terminal constitutes the least significant bit position, to input terminal C0 of multiplexer 208. The level number output of counter 308 is 100 and "0" bits are applied to input terminals SA and SB of multiplexer 208. The "1" bit at input terminal C0 is passed to the D input of flip-flop 230 whereby the T1 timing pulse clocks the flip-flop to the set condition to disable OR gates 221, 217 and 307. Finally, the T1 timing pulse is passed through gate 234 and clocks the address 1011 newly calculated by adder 310 through buffer 312 into register 315. With address 1011 in register 315, the next calculated number of adder 310 is 1100 which will not be used except for the "0" bit in the least significant bit position, as described hereinafter.

The T3, T4, T5 and T6 timing pulses provide no function during this poll word cycle. The T7 timing pulse starts parallel-to-serial converter 304 and the new poll word 100 1011 is sent to the remote stations. This selects the station whose address is 1011 and, as previously presumed, this station has a message thereat and the station returns the message. At the same time, the T7 timing pulse clears flip-flop 203 and starts timer 204. The incoming message is recorded by receiver 301 and the energy derived therefrom sets flip-flop 203 and holds timer 204 clamped so that it cannot time out. At the termination of the message, the energy is removed, removing the clamp from timer 204 permitting flip-flop 203 to stop the timer and thus start a new poll word cycle.

The most significant bit of the level number derived from counter 308 maintains gate 317 disabled, as previously described, precluding the writing of the level and address numbers into RAMS 309 and 314 by the T0 timing pulse. Gate 219 is similarly blocked precluding the incrementing of counter 210 by the T1 timing pulse. At this point, the level output number 100 of counter 308 applies "0" bits to input terminals SA and SB of multiplexer 208. This passes the input bit applied to input terminal C0 to the D input of flip-flop 230. Since the bit applied to input terminal C0 is the least significant bit of the address number provided at the output of adder 310 and since, as previously described, this least significant bit is now a "0" bit, the consequent application of the "0" bit to flip-flop 230 drives the flip-flop to the clear condition in response to the T1 timing pulse. The clearing of flip-flop 230 now enables gates 221, 217 and 307. Finally, the T1 timing pulse loads a new word into register 315 but this word will be subsequently overwritten before the word is transmitted to the remote station.

With gate 221 enabled, the T2 timing pulse is now passed therethrough to decrement counter 210. This brings the output count down to 0001. The T3 timing pulse is now passed to the clock input of register 315 loading the station address word located at address 0001 of RAM 314. At the same time, the T3 timing pulse loads the level number located at address 0001 of RAM 309 into counter 308. Counter 308 thus now contains the level number 011 and register 315 now contains the station address number 1000.

When the T4 timing pulse is generated, it is passed through gate 307 to increment counter 308. This advances the counter to therefore provide at its output the highest level number 100. The T5 and T6 timing pulses do not provide any function at this time for reasons previously described and the T7 timing pulse, in addition to clearing flip-flop 203 and starting timer 204, also starts parallel-to-serial converter 304, which now sends out the poll word 100 1000.

We have presumed that the station having address 1000 does not have a message. The station therefore does not respond and after an interval timer 204 times out to start a new poll word cycle. No function is provided by timing pulse T0 for reasons previously explained.

At this time, with the output level number of counter 308 comprising the number 100 and the output station address word of register 315 comprising the number 1000, adder 310 is providing the output address number 1001. Accordingly, adder 310 applies a "1" bit to input terminal C0 of multiplexer 208 and counter 308 simultaneously applies "0" bits to input terminals SA and SB. Finally, since flip-flop 209 has been previously cleared, it is passing a "0" bit to input terminal SC. Multiplexer 208 therefore passes the "1" bit on input terminal C0 to the D input of flip-flop 230 whereby the flip-flop is clocked by the T1 timing pulse to the set condition to disable gates 221, 217 and 307. Finally, the T1 timing pulse loads the address number 1001 derived by way of buffer 312 from adder 310 into register 315.

The subsequent timing pulses T2, T3, T4, T5 and T6 provide no function at this time. The T7 timing pulse now clears flip-flop 203, starts timer 204 and initiates the operation of parallel-to-serial converter 304. The poll word 100 1001 is thereby sent to the remote station.

It has been presumed that the station having the address 1001 has affirmatively responded that it has a message. The station therefore returns the message to the polling station in response to the reception of the poll word. The energy therefore detected by energy detector 302 sets flip-flop 203 and clamps timer 204. Accordingly, when the message terminates, the clamp is removed from timer 204 and its operation is stopped to initiate a new poll word cycle.

In this new poll word cycle, the T0 timing pulse performs no function for reasons previously described. At this time, the level number 100 is on the output terminals of counter 308. The "1" bit on output terminal QC is passed to lead a3 to disable OR gates 219 and 317 via OR gate 211. With the station address number 1001 on the output terminals of register 315, adder 310 generates a "0" bit for its least significant bit output terminal S1. This "0" bit is applied to input terminal CO of multiplexer 208. With flip-flop 209 cleared and counter 308 applying "0" bits to input terminals SA and SB of multiplexer 208, the "0" bit on input terminal CO is passed to the D input of flip-flop 230. The T1 timing pulse clears the flip-flop, enabling gates 221, 217 and 307. The T1 timing pulse also loads a new number into register 315 but this number will be overwritten subsequently in this poll word cycle.

The T2 timing pulse is now passed through gate 221 to decrement counter 210. The count at the output of counter 210 is thereby decremented to 0000. The T3 timing pulse now loads the level number at address 0000 in RAM 309 into counter 308 and loads the station address number at address 0000 of RAM 314 into register 315. Level number 010 is therefore loaded into counter 308 and station address number 0100 is loaded into register 315. The T4 timing pulse now increments counter 308, advancing the level number to 011. The T5 and T6 timing pulses provide no function during this poll word cycle. The T7 timing pulse now clears flip-flop 203 and starts timer 204. The pulse also initiates the operation of parallel-to-serial converter 304 sending out the poll word 011 010X.

We have presumed that the remote stations having the addresses 0100 and 0101 do not have message thereat. As a consequence, no response is received by the polling station and timer 204 proceeds to time out to initiate a new poll word cycle. Flip-flop 203 remains cleared thereby disabling gates 219 and 317 which causes no function to be performed by the T0 timing pulse. At this time, with the level number 011 being provided at counter 308 and the output station address number 0100 being provided by register 315, adder 310 is providing the new station address number 0110. "1" is provided to input terminals SA, SB of multiplexer 208 and a "0" bit is provided to terminal SC. Adder 310 is passing a "1" bit from terminal S2 to input terminal C3 of multiplexer 208. This "1" bit is thereby passed to the D input of flip-flop and the T1 timing pulse clocks the flip-flop to the set condition. Gates 221, 217 and 307 are thereby disabled. At the same time, the T1 timing pulse loads the output number 0110 of adder 310 into register 315.

The T2, T3, T4, T5 and T6 timing pulses provide no function during this poll word cycle. The T7 timing pulse clears flip-flop 203 and starts timer 204. The operation of parallel-to-serial converter 304 is initiated and the poll word 011 011X is sent to the remote stations.

We have presumed that station 0110 has a message thereat. This station therefore returns the acknowledgment word and flip-flop 203 is thereupon set, enabling gates 219 and 317. The operation of timer 204 is in turn stopped and a new poll word cycle is initiated.

The T0 timing pulse is passed through gate 317 to load the level number 011 at the output of counter 308 into address 0000 of RAM 309 and simultaneously load the station address number 0110 at the output of register 315 into address 0000 of RAM 314. The new address word calculated by adder 310 is 1000. The next to the least significant bit applied to output terminal S2 of adder 310 is therefore "0" and this "0" bit is passed through multiplexer 208 to the D input of flip-flop 230. The flip-flop is therefore clocked to the clear condition by the T1 timing pulse to enabled gates 221, 217 and 307. At the same time, this T1 timing pulse increments counter 210 to the count of 0001 and loads a new word into register 315. This newly loaded word, however, will be overwritten during this poll word cycle. The T2 timing pulse is passed through gate 221 to decrement counter 210 to the count of 0000. The T3 timing pulse loads the level number 011 and station address number 0110 at address 0000 of RAMS 309 and 314 into counter 308 and register 315. The T4 timing pulse now advances counter 308 to the new level number 100. The subsequent timing pulses T5 and T6 provide no function during this poll word cycle.

The T7 timing pulse now clears flip-flop 203 and initiates the operation of timer 204. Parallel-to-serial converter 304 is also started and the poll word 100 0110 is sent to the remote stations. We have previously presumed that the station having the address 0110 has a message. The station thereupon responds by returning the message to the polling station. This sets flip-flop 203 and clamps timer 204. Gates 219 and 317 are disabled, however, bu virtue of the "1" bit at the output of terminal QC of counter 308 passing through gate 211. At the end of the message the clamp is removed from timer 204 which is stopped by flip-flop 203 to initiate the new poll word cycle.

The T0 timing pulse is blocked by OR gates 317 to preclude writing information into RAMS 309 and 314. At this time, the new station address number calculated by adder 310 is 0111. Since counter 308 is providing "0" bits to input terminals SA and SB of multiplexer 208, the least significant "1" bit at output terminal S1 of adder 310 is passed by way of input terminal CO of multiplexer 208 to the D input of flip-flop 230. The T1 timing pulse thereupon clocks the flip-flop to the set condition disabling gates 221, 217 and 307. At the same time, the T1 timing pulse loads the new station address number 0111 provided by adder 310 through buffer 312 into register 315. The T2, T3, T4, T5 and T6 timing pulses do not provide any function during this poll word cycle. The T7 timing pulse clears flip-flop 203, starts timer 204 and initiates the operation of parallel-to-serial converter 304 to send the new poll word 100 0111 to the remote stations.

We have previously presumed that the station having address 0111 has no message thereat. Consequently, the polling station does not receive message energy, flip-flop remains cleared, and timer 204 times out to initiate a new poll word cycle. It is noted, however, at this point that the poll word cycle is identical even if the station having address 0111 has a message, with the exception that timer 204 will be clamped to preclude its stopping or time-out until the transmission of the message terminates. In either event, the "1" bit output at the QC terminal of counter 308 passes through gate 211 to disable gates 219 and 317.

The T0 timing pulse is blocked by gate 317 to preclude writing in the poll word into RAMS 309 and 314. At this time, adder 310 has calculated a new address 1000. The least significant bit output of adder 310 is therefore a "0" bit and this bit is passed to input terminal CO of multiplexer 208. With counter 308 applying "0" bits to input terminals SA and SB of multiplexer 208 and with flip-flop 209 applying a "0" bit to input terminal SC, the multiplexer passes the "0" bit input on terminal CO to input terminal D of flip-flop 230. The T1 timing pulse thereupon clears the flip-flop, enabling gates 221, 217 and 307. The T1 timing pulse, however, does not increment counter 210 since gate 219 is disabled and the new station address number loaded into register 315 by the T1 pulse will be subsequently overwritten in this poll word cycle.

The T2 timing pulse is now passed through gate 221 to decrement counter 210. Since the counter is now in count state 0000, the decrementing of the counter results in a borrow output and this consequent high condition is passed to the D input of flip-flop 207. The T3 timing pulse loads new numbers into counter 308 and register 315, but these new numbers will both be overwritten during this poll word cycle. The T4 timing pulse clocks flip-flop 207 to the set condition to signal that this poll word cycle is the last cycle of the polling sequence. This restores flip-flop 209 to the set condition and enables gates 220, 216 and 233. The T4 pulse also increments counter 308 but another number will be overwritten into the counter during this poll word cycle. The T5 pulse now passes through gate 220 to clear counter 210, restoring the counter to the count of 0000 and removing the borrow output.

At this point, as previously described, counter 200 has at its outputs a measure of the duration of the last polling sequence this measure being in the form of a four bit count. This count is applied to ROM 201 which, in accordance with the previously described algorithm, determines the new level number, which new level number is provided to output terminals QA, QB and QC of ROM 201 when the ROM is enabled. When the T6 timing pulse is generated, counter 205 is in the sixth count and a low condition is applied to output leader A to enable ROM 201 and disable RAM 309. This T6 pulse is passed through OR gate 216 and gate 218 to load into counter 308 the new level number. At the same time that the T6 timing pulse is passed through gate 216, it clears register 315 whereby the first address number 0000 is loaded therein. The T7 timing pulse now starts parallel-to-serial converter 304 to send out the new poll word having the new level and the station address number 0000. Flip-flop 203 is cleared, counter 200 is restored to the count of "0" and the operation of timer 204 is initiated. The polling station awaits the response of the polled remote stations and when this response is received the first poll word cycle of a new polling sequence is thereby initiated.

Figure 5:
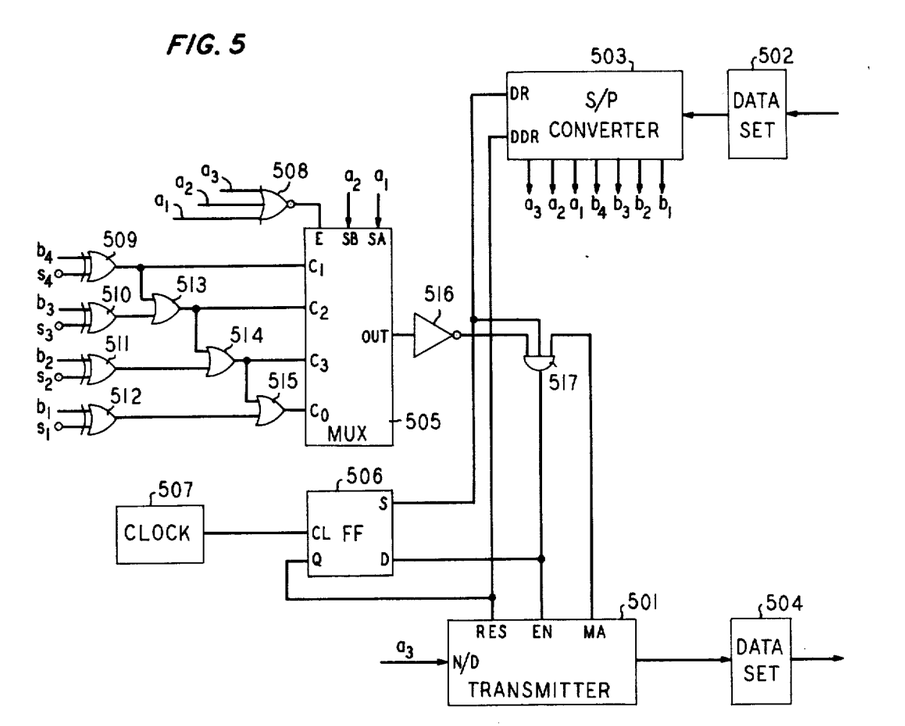
FIG. 5 shows in schematic form the various circuits which form a typical terminal station arranged to cooperate with the central polling station.

A typical remote station is shown in FIG. 5. Line signals from the control station are received by data set 502 and converted to binary bits and shifted into serial-to-parallel converter 503. It is recalled that each poll words consists of a start bit followed by the three bits ($a1$ to $a3$) designating the polling level number and four bits ($b1$ to $b4$) designating the station address number. When these eight bits have been shifted into serial-to-parallel converter 503, the consequent shifting of the initial start bit into an initial stage register designates the storage of the full poll word and provides the storage of a "1" bit at output terminal DR of serial-to-parallel converter 503. At the same time, the bits defining the polling level number appear on output leads $a1$ through $a3$ and the bits defining the station address number appear on output leads $b1$ and $b4$. The high condition ("1" bit) at output terminal DR designates that the word on output leads $a1$ through $a3$ and $b1$ through $b4$ is a valid polling word. This stored high condition at output terminal DR is retained until a negative transition is applied to terminal DRR.

Responses by the remote station are provided by transmitter 501, which responses are passed to data set 504. The data set converts the bnary bit responses to line signals which are applied to the transmission line and thus back to the control station. Transmitter 501 stores the response word and is further arranged to accept and store a response message. When a response message is stored therein, a negative transition to input terminal RES results in the storage of a high condition at output terminal MA. A subsequent high condition applied to input terminal EN enables the transmitter to initiate is operation. This operation involves the sending of the response word when a "0" bit is passed to input terminal N/D and the sending of the response message when a "1" bit is applied to input terminal N/D. In either event, at the conclusion of the transmission of the response word or the response message, the high condition at output terminal MA is removed and, as described hereinafter, the operation of the transmitter is terminated.

The principal control of the remote station is provided by multiplexer 505. Multiplexer 505 has a set of control inputs E, SA and SB. Bits $a1$ and $a2$ of the poll word are applied to input terminals SA and SB and the output of NOR gate 508 is applied to input terminal E. In addition, multiplexer 505 has a set of signal inputs C0 through C3. The functional attributes of multiplexer 505 are defined by Functional Table IV set forth below:

FUNCTION TABLE IV

| E | SB | SA | OUTPUT |
|---|----|----|--------|
| 0 | 0  | 0  | C0     |
| 0 | 0  | 1  | C1     |
| 0 | 1  | 0  | C2     |
| 0 | 1  | 1  | C3     |
| 1 | X  | X  | 0      |

The output of exclusive OR gate 509 is passed to input terminal C1 of multiplexer 505. This output is also applied through OR gate 513 to input terminal C2, through OR gate 514 to input terminal C3 and through OR gate 515 to input terminal C0. The other input to OR gate 513 is provided by exclusive OR gate 510 while the other input to OR gates 514 and 515 are provided by exclusive OR gates 511 and 512. Bits $b1$ through $b4$ of the poll word provide one of the inputs to exclusive OR gates 509 through 512. The other inputs to exclusive OR gates are provided by the bits of a 4-bit comparison word, the bits S1 through S4 of the comparison word defining the exclusive station address number of the particular remote station. Thus, exclusive OR gates 509 through 512 compare the bits of the incoming station address number with the bits of the unique address number assigned to this remote station. If the most significant bits are the same, exclusive OR gate 509 provides a "0" bit at this output. Similarly, exclusive OR gates 510 to 512 apply "0" bits at their outputs, if the other bits of the station address number are the same as the unique number assigned to the remote station. If the most significant bits are identical, a "0" bit is applied to input terminal C1 of multiplexer 505; if the two most significant bits are identical, "0" bits are applied to input terminals C1 and C2; if the three most significant bits are identical, "0" bits are applied to input terminals C1, C2 and C3; and if all of the bits of the incoming station address number are identical to the unique station address number of the control station, "0" bits are applied to all input terminals C0 through C3.

The input of NOR gate 508 comprises bits $a1$ through $a3$ of the polling level number. Accordingly, exclusive OR gate 508 applies a "1" bit to input terminal E only in the event that the polling level number 000 is received.

Referring now to Function Table IV, it can be seen that when the highest polling level number 000 is received, a "0" bit is invariably passed by multiplexer 505 to inverter 516. If the next polling level 011 is received, the bit applied to input terminal C1 is passed to inverter 516. In the event that the polling level number 010 is received, the input bit applied to input terminal C2 is passed to inverter 516. When the polling level number 011 is received, the input bit applied to terminal C3 is passed to inverter 516. Finally, when the lowest polling level number 100 is received, the bit passed to input terminal C0 is applied to inverter 516. Accordingly, inverter 516 partially enables gate 517 when the highest level number 000 is received; when the poll level number 001 is received and the most significant bit of the station address number is the same as the most significant bit of the unique address of the remote station; when the poll level number 010 is received and the two most significant bits are the same as the remote station's number; when the poll level number 011 is received and the three most significant bits of the station address number appear; and finally when the lowest poll level number 100 is received and all of the bits of the station address number are identical with the unique address number of the remote station. Under any of these above events, AND gate 517 is partially enabled by inverter 516 and further enabled by the high condition at output terminal DR of serial-to-parallel converter 503.

In the initial condition of the remote station, flip-flop 506 is normally clear. Assume now in this condition that the station receives a poll word intended to select a station or stations other than this station. This poll word is passed by data set 502 to serial-to-parallel converter 503. The condition on output terminal DR goes high partially enabling AND gate 517. Since the poll station address number does not select this station, the output of inverter 516 remains low. This precludes the enabling of gate 517 passing a low condition to the D input of flip-flop 506 and to the EN input of transmitter 501 precluding the enabling of the operation of the transmitter. The next subsequent clock pulse from clock 507 clocks flip-flop 506 to the clear condition. The negative transition on output terminal Q is passed to terminal DRR of serial-to-parallel converter 503 removing the high condition on output terminal DR which, in turn, will put FF 506 into the set condition. Accordingly, this remote station does not respond and is restored to is initial condition.

Assume now that an incoming poll word is intended to query this remote station (or this and other remote stations). When the poll word has been fully received, the condition on output terminal DR of serial-to-parallel converter 503 goes high. At the same time, the output of inverter 516 goes high and both high conditions partially enable AND gate 517.

In the event that no message is available in transmitter 501, the condition on output terminal MA is low and this low condition disables AND gate 517. The outut condition of AND gate 517 is low precluding the operation of transmitter 501 and the low condition is also passed to input D of flip-flop 506 whereby the flip-flop is clocked back to the clear condition. The consequent negative transition on output terminal Q now removes the high condition at output terminal DR of serial-to-parallel converter 503. The remote station is thus restored to its initial condition.

Assume now that a poll word designed to query this station is received and transmitter 501 has a message stored therein. Further, assume that with the message stored therein flip-flop 506 has been clocked at some time to the clear condition. The negative transition at output terminal Q passed to input terminal RES of transmitter 501 had thus provided a high condition at output terminal MA to indicates a message is stored in transmitter 501. When the poll word is fully received, inverter 516 and output terminal DR of serial-to-parallel converter 503 apply high conditions to grate 517. The high condition output terminal MA of transmitter 501 fully enables gate 517. Gate 517 thereupon applies an enabling potential to input terminal EN of transmitter 501 and a high condition to input terminal D of flip-flop 506 to maintain the flip-flop in the set condition. If the poll level number is other than the lowest number 100, bit $a3$ applies a "0" bit to input N/D of transmitter 501. The transmitter thereupon sends the response word back to the control station and at the termination thereof removes the high condition at output terminal MA. Gate 517 becomes disabled, removing the enabling potential from transmitter 501, which thereupon stops, and applying a low potential to input terminal D of flip-flop 506. The flip-flop is clocked to the clear condition removing the high condition at output terminal DR of serial-to-parallel converter 503 and restoring the high condition at output terminal MA of transmitter 501 to again indicate that a message is stored in the transmitter.

In the event that the poll word contains the lowest poll level number 100, a "1" bit is applied by bit $a3$ to input terminal N/D of transmitter 501. When AND gate 517 is fully enabled, as described above, transmitter 501 is enabled to send the response message. At the completion of the response message, the potential at output terminal MA goes low, disabling gate 517 which, in turn, stops transmitter 501 and permis flip-flop 506 to be clocked to the clear condition to remove the high condition at output terminal DR of serial-to-parallel converter 503 and restore the remote station to is initial condition.

Although a specific embodiment of this invention has been shown and described, it will be understood that various modifications may be made without departing from the spirit of this invention.

We claim:

1. A polling system including a control station and a plurality of remote stations, the control station including means for transmitting a sequence of polling words to query the remote stations, polling words designating remote station groups of various sizes and means responsive to responses to the group polling words for sending subsequent polling words in the sequence which designate successively smaller group sizes until individual stations respond, CHARACTERIZED IN THAT
    the control station further includes means responsive to the quantity of the responses in a sequence for calculating which one of the various group sizes is to be designated by the initial polling word of a subsequent sequence.

2. A polling system, in accordance with claim 1, wherein the quantity of the responses in a sequence is determined by means for measuring the duration of time required to complete the sequence.

3. A polling system, in accordance with claim 2, wherein the calculating means includes means for designating the subsequent initial group size as inversely related to the measured duration of time.

4. A polling system, in accordance with claim 3, wherein the calculating means includes means for designating all the remote stations as the largest group size and individual remote stations as the smallest group size.

5. A polling system, in accordance with claim 3, wherein the remote stations are arranged in groups and subgroups and the calculating means includes means for designating group and subgroup sizes.

6. A system for collecting messages from a plurality of remote stations including a control station having means for sending initial queries to remote stations in groups and means responsive to acknowledgements to the initial queries for sending queries to successively smaller group sizes until the messages are collected, CHARACTERIZED IN THAT the control station further includes means responsive to the quantity of collected messages for determining the group size to be queried in a subsequent initial query.

7. A system for collecting messages in accordance with claim 6 wherein the quantity of messages collected is calculated by means for measuring the duration of time required to query the remote stations until the messages are collected.

8. A system for collecting messages, in accordance with claim 7, wherein the determining means includes means for designating the group size to be inversely related to the measured duration of time.

9. A system for collecting messages, in accordance with claim 8, wherein the determining means includes means for designating all the remote stations as the largest group size and individual remote stations as the smallest group size.

10. A system for collecting messages, in accordance with claim 8, wherein the remote stations are arranged in groups and subgroups and the determining means includes means for designating group and subgroup sizes.

11. In a polling system, a plurality of remote stations arranged in groups, each individual station having means responsive to a query addressed individually thereto for sending a message and means responsive to a query addressed to the group thereof for sending an acknowledgement indicating the presence of a message thereat, a control station for sending a sequence of queries to collect messages from the remote stations including means responsive to an acknowledgement to a group query for sending queries addressed to individual stations in the group and means responsive to the quantity of messages collected for alternatively selecting a group query or an individual query as the initial query of the next sequence.

12. In a polling system, in accordance with claim 11, wherein the selecting means includes means for measuring the duration of the sequence to determine the quantity of messages collected.

13. In a polling system, in accordance with claim 12, wherein the selecting means includes means responsive to a measured duration exceeding a predetermined threshold for limiting the next sequence to the sending of individual queries.

* * * * *